United States Patent Office 3,080,409
Patented Mar. 5, 1963

3,080,409
PREPARATION OF ORGANO GROUP II-B
COMPOUNDS
Shirl E. Cook and Everett M. Marlett, Baton Rouge, La., assignors to Ethyl Corporation, New York, N.Y., a corporation of Virginia
No Drawing. Filed May 31, 1961, Ser. No. 113,617
4 Claims. (Cl. 260—429.9)

The present invention is concerned with a process for the manufacture of organo group II–B metal compounds, especially dialkyl zinc.

Numerous methods have been described in the literature for the preparation of the organo group II–B metal compounds. Such procedures have, however, been employed in a very limited sense and primarily for laboratory uses. The most prevalent procedures so employed include the reaction of a group II–B metal halide with the Grignard reagent or the reaction of the group II–B metal, or an alloy thereof with an alkyl halide. Among the inherent disadvantages of these procedures which have limited their usage to laboratory purposes is that in the Grignard reaction, the yields obtained are moderate and the process inherently requires ether solutions. The reaction of the metal, or alloys thereof, with an alkyl halide likewise is disadvantageous because of the slowness of the reaction, the low yields obtained, and the necessity of handling the more hazardous alkyl halide materials. Further, this process suffers the disadvantage of producing alkyl metal halides as by-products in considerable amount unless strict control is employed.

More recently, a process has been postulated wherein, for example, zinc chloride is reacted directly with triethylaluminum in a 1:2 molar ratio, respectively, in the absence of a solvent to produce diethyl zinc. This process also suffers certain disadvantages, particularly in that the method is difficult to control, a heat-kick is obtained, and the yields are somewhat erratic. While it is also known to conduct the reaction of a group II–B metal halide with a trialkylaluminum or alkyl aluminum halide in the presence of an organic solvent, this type processing is disadvantageous in that the recovery of the desired products, especially the diorgano group II–B metal compound, is even more difficult and the stoichiometry must be carefully controlled in order to minimize the formation of by-product and less desirable organo group II–B metal halide.

Therefore, it is highly desirable to the industry to provide a more efficient and effective method for the production of the organo group II–B metal compounds, especially the dialkyl zinc products.

The group II–B organometallic compounds have been primarily useful as intermediates in the formation of other organometallic compounds. For example, diethyl zinc has long been used in the laboratory for reacting with lead halides to produce tetraethyllead. The reaction of diethyl mercury with sodium metal is a laboratory procedure for producing ethyl sodium. While there are other more limited uses for the organo group II–B metal compounds presently known, it is desirable to provide these materials by more efficient processes in order to facilitate their use in the above reactions and promote more wide spread uses of these valuable chemical tools.

Accordingly, an object of this invention is to provide a new and novel process for the preparation of the organo group II–B metal compounds. Another object is to provide the organo group II–B metal compounds in higher yield and purity than heretofore available. A still further object is to provide a more economical and simplified procedure for the production of the organo group II–B metal compounds. An additional object of this invention is to provide a more economical and efficient process for the manufacture of dialkyl zinc compounds. These and other objects will be apparent as the discussion proceeds.

It has now been found that organo group II–B metal compounds can be prepared more efficiently in higher yield and purity by reacting a group II–B metal halide with a triorgano group III–A element compound in the initial presence of an organo group III–A metal halide compound. Of the group II–B metal halides, those of zinc and cadmium are preferred, especially zinc chloride. Of the organo group III–A metal halide compounds, those in which both the halogen is the same as the halogen of the group II–B metal salt and the group III–A metal is the same as the metal of the triorgano group III–A element compound are preferred, especially the lower dialkyl aluminum chloride and dialkyl boron chloride compounds, e.g. diethyl aluminum chloride and diethyl boron chloride. Likewise, it has been found that the lower trialkyl compounds of boron and aluminum, particularly triethylaluminum and boron, produce best results. Although the temperature of the reaction is subject to considerable latitude, it is preferable to perform the reaction at between about 25 to 150° C. Thus, a preferred embodiment comprises the reaction of zinc chloride with triethyl aluminum at a temperature between about 25 to 150° C. in contact with and in the initial presence of diethyl aluminum chloride.

The process of this invention is of particular advantage in that higher yields and purity of the desired group II–B metal compound can be obtained in comparatively short reaction times. Further, the process is readily adaptable to continuous operation. An additional advantage is that the problems of heat control, induction period, and the like, generally encountered in the prior art processes are obviated by the present method. Further, in the preferred embodiments, only a two component system is involved, thus greatly simplifying recovery procedures, handling, and the like. Despite the fact that it is shown in the art that group II–B metal halides will react with organometal halides, such as ethyl aluminum sesquichloride, quite unexpectedly no complications are presented in the present process while still obtaining higher yields and purity of the diorgano group II–B metal product as well as other advantages of the process of this invention. Additional advantages of the process are that other diluents, such as mineral oil, are avoided, unnecessary, and preferably excluded while still achieving an effective heat control permitting operation at moderate temperatures. Further advantages of the invention will be evident as the discussion proceeds.

In general, the triorgano group III–A element compounds are those compounds having only carbon to group III–A element bonds. Thus, typical examples of the triorgano group III–A element compound include trimethylaluminum, triethylaluminum, triethylborane, methyldiethylaluminum, tripropylaluminum, dimethylhexylaluminum, trioctylaluminum, trioctylborane, triisobutylaluminum, trivinylborane, tri-1-hexenylborane, tri-1-hexynylaluminum, trioctadecylaluminum, tricyclohexylaluminum, tricyclopentylaluminum, triphenylaluminum, triphenylborane, tribenzylaluminum, trinaphthylaluminum, tricyclohexenylaluminum, and the like compounds wherein gallium, indium, or thallium are substituted for boron or aluminum. In general, the hydrocarbon portions of such materials will contain up to about 30 carbon atoms and higher. It is to be understood that the hydrocarbon portions can be further substituted to result in branched chain isomers or substituted with functional groups which are essentially inert in the reaction. The preferred triorgano group III–A element compounds are those of the elements boron and aluminum wherein all the valences are satisfied by lower alkyl radicals, i.e. alkyl radicals having up to about 8 carbon atoms. The lower trialkylboranes and trialkylaluminum compounds, especially the latter, are preferred since higher yields are obtained with such reactants. A particularly preferred group of reactants comprises triethylborane and triethylaluminum.

The group II-B metal halide reagents employed are the halides of the metals zinc, cadmium, and mercury. The halides are intended to include the chlorides, bromides, fluorides, and iodides. Thus, typical examples of this reagent include zinc chloride, cadmium chloride, zinc bromide, zinc iodide, mercurous and mercuric chloride, and the like. The halides of zinc and cadmium, especially zinc chloride, are preferred. While not required, this reagent is generally employed in finely divided form as, for example, of particle sizes having a major dimension of about $\frac{1}{16}''$ and preferably below about 50 microns.

The organo group III-A metal halide which is employed initially in the reaction can, in general, be any organo group III-A metal halide which is liquid under the reaction conditions. Again, the group III-A metals are those elements of group III-A of the periodic chart, e.g., boron, aluminum, gallium, etc. Among further criterion of choice of the organo group III-A metal halide is that they preferably be liquid at ordinary temperature and pressure conditions. The halogens attached to the group III-A metal include the chlorides, bromides, iodides, and fluorides, with the chlorides being preferred. Typical examples of the organo group III-A metal halide compound include dimethyl aluminum chloride, bromide, or iodide; diethyl aluminum chloride, bromide, or fluoride; dipropyl aluminum chloride, ethyl aluminum dichloride, ethyl aluminum sesquichloride, dioctylaluminum chloride, diisobutyl aluminum chloride, di-1-hexynyl aluminum chloride, di-1-hexenyl aluminum chloride, di-1-hexenyl aluminum bromide, dicyclohexyl aluminum chloride, diphenyl aluminum chloride, dicyclohexenyl aluminum chloride, and the like compounds wherein gallium, indium, thallium, or boron are substituted for aluminum. In general, the hydrocarbon portions of such materials will contain up to and including about 30 carbon atoms. While the hydrocarbon group III-A metal halides are preferred, it is to be understood that the hydrocarbon groups can be further substituted with functional groups that are essentially inert in the reaction, as well as branched chains and the like. It is preferable to employ a hydrocarbon group III-A metal halide which contains only hydrocarbon groups identical to the hydrocarbon groups of the triorgano group III-A element reagent, the same group III-A element as the group III-A element of the triorgano group III-A element reagent, and the same halogen as the halogen contained in the group II-B metal halide reactant. The di lower alkyl boron chlorides and di lower alkyl aluminum chlorides, especially the latter, wherein the alkyl groups contain up to and including about 8 carbon atoms each are preferred. Particularly preferred are the diethyl and diisobutyl aluminum and boron chlorides.

The proportion of the reagents employed are subject to considerable latitude. For example, an excess of either the triorgano group III-A element compound or the group II-B metal halide can be employed. However, for more effective results, it is preferable to employ the triorgano group III-A element compound in excess. In order to obtain the most effective and optimum yields in the shortest periods of time, best results are obtained when employing at least, and preferably essentially only, two moles of the triorgano group III-A element compound per mole of the group II-B metal halide. The organo group III-A metal halide is generally employed in varying amounts as, for example, even diluent quantities. Ordinarily, between about 1 to 15 or higher parts of the organo group III-A metal halide per part by weight of the group II-B metal halide is employed. Most efficient results are obtained when essentially between about 2 to 6 parts by weight of the organo group III-A metal halide per part of the group II-B metal halide reagent is employed. In preferred embodiments, at least the aforementioned amounts of the organo group III-A metal halide compound are also preferably maintained in the reaction system during the entire course of the reaction.

The mechanical operations of the processing of this invention are subject to many variations so long as the organo group III-A metal halide is present in the reaction system prior to any contact between the group II-B metal halide and the triorgano group III-A element compound. Thus, for example, a designated portion of the organo group III-A metal halide can be admitted to a reactor and then the triorgano group III-A metal compound added thereto with subsequent addition of the group II-B metal halide. The reverse addition, i.e., first adding the group II-B metal halide to the organo group III-A metal halide and then adding the triorgano group III-A element compound, can be employed and is generally preferred over the preceding. Thus, one can disperse the solid group II-B metal halide in the liquid organo group III-A halide by agitation and then add the triorgano group III-A element compound. Likewise, both the group II-B metal halide and the triorgano group III-A element compound can be simultaneously added to the liquid organo group III-A metal halide compound contained in the reactor. At the completion of the reaction, the reaction mixture can be employed as obtained or subjected to various recovery procedures such as distillation to recover the desired organo group II-B metal product from the organo group III-A metal halide by-product and that which was initially added. Thus, it is to be noted that the processing involved is quite simplified minimizing the amount of handling necessary, recovery operations, and resolving itself basically to only a two component system. Other modifications of the operational techniques will now be evident.

The novel process will be more completely understood from the following examples wherein all parts are by weight unless otherwise specified.

*Example I*

To a reactor equipped with a means for internal agitation and external heating means was added 49 parts of ethyl aluminum sesquichloride ($Et_3Al_2Cl_3$). Then, 25 parts of triethylaluminum were slowly added to the reactor. In this manner, diethyl aluminum chloride was formed in the reactor. Next, 13.6 parts of finely divided zinc dichloride were added and the mixture heated with agitation to 100° C. While maintaining this temperature, 23 parts of triethylaluminum were added over a period of about 20 minutes. A vacuum was placed on the system (75 mm. mercury) during the course of addition of the triethylaluminum and maintained in order to continuously distill the diethyl zinc product from the reactor as formed. In this manner, diethyl zinc was obtained in an overall yield of 92.7 percent with 73.4 percent of the theoretical yield being recovered as overhead. With more efficient distillation conditions, essentially all of the recoverable yield can be obtained as overhead.

*Example II*

The above example is repeated with exception that the reaction is conducted at about 25° C. and atmospheric pressure under a blanket of nitrogen. In this run, essentially no heat kick is obtained and diethyl zinc dissolved in diethylaluminum chloride is produced in high yield.

*Example III*

Employing the reactor of Example I, 75 parts of diethyl aluminum chloride are added thereto along with 18 parts of cadmium chloride. Then, 23 parts of triethylaluminum are fed to the reactor while maintaining the reaction system at a temperature of 50° C. for 1 hour. In this manner, diethyl cadmium dissolved in diethylaluminum chloride is obtained in good yield.

*Example IV*

The procedure of Example III is repeated essentially as described with exception that the sequence of addition of the triethylaluminum and cadmium chloride is reversed with the total reaction period being 2 hours. An essentially quantitative yield of diethyl cadmium is obtained.

*Example V*

Example III is repeated with exception that equivalent amounts of trioctylborane, dioctyl boron bromide, and zinc bromide are substituted, respectively, for triethylaluminum, diethylaluminum chloride, and cadmium chloride. Dioctyl zinc dissolved in dioctyl boron bromide is obtained in good yield.

*Example VI*

When reacting 52 parts of triphenylaluminum with 13.6 parts of zinc chloride in the initial presence of 150 parts of diphenyl aluminum chloride, diphenyl zinc is obtained in high yield.

*Example VII*

Employing the procedure of Example III, 27 parts of mercuric chloride are reacted with 18 parts of trivinyl borane in the initial presence of divinyl boron chloride at room temperature for 1½ hours. In this manner, divinyl mercury dissolved in a mixture of vinyl boron dichloride and divinyl boron chloride is obtained.

*Example VIII*

Dicyclohexyl zinc dissolved in dicyclohexylaluminum chloride is obtained in good yield when 13.6 parts of zinc chloride are reacted with 55 parts of tricyclohexylaluminum in the initial presence of 115 parts of dicyclohexylaluminum chloride at 100° C. for 2 hours.

*Example IX*

When 32 parts of zinc iodide and 54 parts of tri-5-hexynyl aluminum are added to 158 parts of di-5-hexynyl aluminum iodide and the reaction mixture maintained at 90° C. for 1 hour with agitation under a nitrogen atmosphere, di-5-hexynyl zinc in admixture with di-5-hexynyl aluminum iodide is obtained.

The following example will illustrate a particular embodiment of this invention wherein a continuous process is readily performed.

*Example X*

To a reactor such as that employed in Example I is first charged 750 parts of diethyl aluminum chloride. Then, 136 parts of zinc chloride and 228 parts of triethylaluminum are continuously and simultaneously fed and mixed into the diethyl aluminum chloride maintaining a residence time at 80° C. of essentially ½ to 1 hour while continuously withdrawing, from the bottom of the reactor, product mixture. The product mixture is transferred to a filter where any solids which might be contained therein are removed, then the filtrate is continuously transmitted to a distillation column operated at 50 mm. mercury pressure with the overhead temperature at about 50° C. In this manner, diethyl zinc is continuously produced and recovered from the overhead of the distillation column with diethyl aluminum chloride continuously withdrawn from the bottom and partially recycled to the reactor. Under steady-state conditions, diethyl zinc is continuously produced in yields in excess of 90 percent.

The above examples are presented by way of illustration and it is not intended to be limited thereto. It will now be evident that other group II–B metal halides, tri-organo group III–A element compounds and organo group III–A metal halides discussed hereinbefore can be substituted to produce similar results.

As evident from the above examples, the temperature at which the reaction is conducted is subject to considerable latitude. In general, temperatures between about 0° C. up to decomposition temperature of the reactants and product, are employable. However, in order to minimize side reactions and decomposition of product, it is preferable to conduct the reaction at a temperature between about 25 to 150° C. The length of reaction time also varies, in some instances being essentially instantaneous and in others requiring longer reaction periods in order to effect completeness. Generally speaking, the reaction will be complete within about 5 hours with shorter reaction times being required as the temperature is increased as between about 75 to 150° C.

While the reaction is generally conducted at atmospheric pressure, it is to be understood that the pressure can be varied over a wide range including vacuum systems or pressures above atmospheric where applicable.

Because of the flammability of the organo group III–A element compounds, the reaction is generally conducted in a closed system or in the presence of an inert atmosphere including, for example, nitrogen, argon, neon, krypton, xenon, and the like.

When it is desired to recover the organo group II–B metal product from the reaction system, various methods can be employed. However, distillation is usually employed and preferred. The distillation conditions can be varied over a considerable range dependent primarily on the boiling point of the organo group II–B metal product at the chosen pressure. Therefore, suitable temperature and pressure conditions are employed to effect good recovery with minimal degradation of the products.

Having thus described the process of this invention, it is not intended that it be limited except as set forth in the following claims.

What is claimed is:
1. The process for the manufacture of a hydrocarbon group IIB metal compound (A) by reacting together an inorganic group IIB metal halide (B) and a trihydrocarbon group IIIA element compound (C) in the presence of a hydrocarbon group IIIA element halide (D) as the sole reaction medium, said halide (D) being inert to the reactants (B) (C), and distilling the so-formed hydrocarbon group IIB metal compound from the reaction medium, the hydrocarbon radicals of (A) (B) and (C) being the same, the halogens of (B) and (D) being the same, and the group IIIA elements of (C) and (D) being the same.

2. The process of claim 1 wherein the reaction is conducted at a temperature between about 25 to 150° C.

3. The process of claim 2 further defined in that essentially two moles of said trihydrocarbon group III–A element compound is employed per mole of said inorganic group II–B metal halide.

4. The process for the manufacture of diethyl zinc comprising reacting together triethyl aluminum and zinc chloride, in the presence of diethyl aluminum chloride as the sole and inert reaction medium, and vaporizing the so-formed diethyl zinc from said reaction medium.

References Cited in the file of this patent
FOREIGN PATENTS 1,246,540     France                  Oct. 10, 1960